United States Patent Office 3,544,685
Patented Dec. 1, 1970

3,544,685
TREATMENT OF ASTHMATIC BRONCHIAL CONDITIONS INVOLVING HEART INSUFFICIENCY
Karl Heinz Klingler, Langen, Hesse, Germany, assignor to Deutsche Gold- und Silber-Scheideanstalt vormals Roessler, Frankfurt am Main, Germany
No Drawing. Filed July 26, 1968, Ser. No. 747,847
Int. Cl. A61k 27/00
U.S. Cl. 424—253                      13 Claims

ABSTRACT OF THE DISCLOSURE

Pharmaceutical application of compounds of the formula

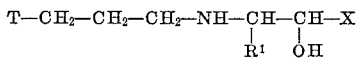

wherein T signifies the theophyllinyl-(7)-radical, $R^1$ is H or $CH_3$ and X is 2, 3 or 4 hydroxy substituted phenyl or 3,5 dihydroxy substituted phenyl, or when $R^1$ is $CH_3$, X can also be 3,4 dihydroxy substituted phenyl, which possess broncholytic activity combined with a strong positive inotropic action (activity in increasing contraction amplitude of the heart) in the treatment of asthmatic bronchial conditions such as asthma, bronchitis, silicosis and emphysema with latent or manifest heart insufficiency.

DESCRIPTION OF THE INVENTION INCLUDING PREFERRED EMBODIMENTS

According to the invention it was unexpectedly found that theophylline derivatives of the above formula unexpectedly possess a combined broncholytic (bronchodilating) action and a positive inotropic action rendering them especially suited for the treatment of asthmatic bronchial conditions in mammals which also involve a latent or manifest heart insufficiency.

Illustrative examples of the theophylline derivatives which can be employed according to the invention for the treatment of asthmatic conditions involving heart insufficiencies (manifest or latent) are:

(a) 7 - {3-[2-(3,5 - dihydroxy phenyl)-2-hydroxy-ethyl-amino]-propyl}-theophylline·HCl

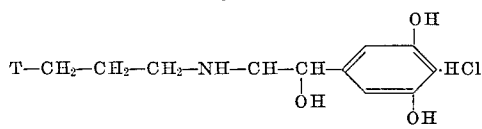

This compound was prepared as follows:
80 g. of 7(γ-benzyl amino propyl)theophylline, produced by reaction of 7(γ-chloro propyl)theophylline with benzyl amine, were dissolved in 250 ml. of 25% aqueous ethanol and boiled under reflux under nitrogen while a solution of 20 g. of 3,5 dihydroxy-ω-chloroacetophenone in 130 ml. of ethanol was gradually added while stirring over a 3 hour period. After such addition was completed the mixture was refluxed for a further 3 hours and then the ethanol distilled off. The residue was stirred up with 150 ml. of warm water and the water poured off and the remaining mass stirred up with 175 ml. of 5% HCl. After two days' standing the mixture was filtered whereupon 46 g. of 7{3-[2-(3,5-dihydroxy phenyl)-2-oxo-ethyl-benzylamino]-propyl}theophylline·HCl were obtained which were purified by boiling with ethanol. 10 g. of this product were then catalytically hydrogenated, to effect reduction of the oxo group and debenzylation, in a mixture of 180 ml. of water, 75 ml. of methanol in the presence of 1 g. of a 10% palladium carbon catalyst by shaking with hydrogen. After the calculated quantity of hydrogen was taken up the catalyst was filtered off and the filtrate boiled down under vacuum. The crystalline residue was boiled up with ethanol and filtered. 5.5 g. of 7-{3-[2-(3,5-dihydroxy phenyl) - 2-hydroxy - ethylamino]-propyl}-theophylline·HCl of a melting point of 245–248° C. were obtained.

(b) 7-[3-(2-p-hydroxy phenyl-2-hydroxy-ethyl-amino)-propyl]-theophylline·HCl

This compound was prepared as follows:
90 g. of 7-(γ-benzyl amino propyl)-theophylline·HCl were dissolved in water and the solution rendered strongly alkaline with NaOH. The resulting mixture was shaken out several times with chloroform and the resulting chloroform solution dried over potassium carbonate. The solvent was then distilled off and the resulting remaining base dissolved in 250 ml. of 25% ethanol. Such solution was then boiled under reflux while adding a solution of p-chloroacetylphenol in 125 ml. of ethanol over a 2 hour period. The resulting mixture was then refluxed for a further 3 hours. The reaction mixture was filtered and diluted with 630 ml. of ethanol and acidified with ethanolic HCl. The 7-[3-(2-p-hydroxy phenyl-2-oxo-ethyl benzyl amino)-propyl]-theophylline·HCl which crystallized out after cooling was filtered off and recrystallized from methanol-water. (Yield: 38.7 g.)

27.5 g. of this product were hydrogenated in a mixture of 140 ml. of distilled water and 140 ml. of methanol containing 2.5 g. of a 5% palladium carbon catalyst at 60° C. After the hydrogen take up ceased the catalyst was filtered off and the filtrate boiled down. The residue was recrystallized from ethanol-water. Yield 16.3 g. of 7-[3-(2-p-hydroxy phenyl-2 - hydroxy - ethyl-amino)-propyl]-theophylline·HCl of a melting point of 207–208° C.

(c) 7-[3 - (1'-methyl-2' - p-hydroxy-phenyl - 2'-hydroxy-ethyl-amino)-propyl]-theophylline·HCl

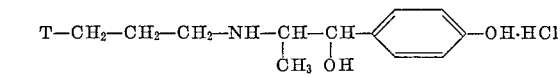

This product was obtained analogously using p-(α-chloropropionyl)-phenol instead of p-chloroacetylphenol as the starting material. Its melting point is 231–232° C.

The compounds can be employed in the form of the free base but preferably are employed in the form of their pharmacologically acceptable acid addition salts such as the hydrochlorides illustrated above or the equivalent salts of other acids such as hydrobromic acid, sulfuric acid, phosphoric acid, acetic acid, maleic acid, fumaric acid, lactic acid, tartaric acid, citric acid and gluconic acid.

The compounds according to the invention can be administered parenterally, enterally, orally, sublingually and spray inhalation in the form of tablets, capsules, drops, emulsions, suspensions, injection solutions and aerosols.

The broncholytic and positive inotropic action of the compounds employed according to the invention is evidenced by tests carried out with isolated guinea pig trachea according to the recognized method of Castillo and De Beer and the isolated guinea pig heart according to the recognized Langendorff method, the results of which are given in the following tables. The substances tested were those described under (a), (b) and (c) as racemates.

TABLE 1.—BRONCHOLYTIC ACTIVITY

| Substance | Effective concentration P=papaverine standard S=substance tested | Activity ratio, papaverine=1 |
|---|---|---|
| (a) | $P=1.48 \times 10^{-5}$ mg./ml. $S=1.79 \times 10^{-7}$ mg./ml. | 83 |
| (b) | $P=1.21 \times 10^{-5}$ $S=7.35 \times 10^{-7}$ | 16 |
| (c) | $P=1.52 \times 10^{-5}$ $S=2.63 \times 10^{-7}$ | 57 |

TABLE 2.—POSITIVE INOTROPIC ACTION

| Substance | Dosage $\gamma$ single injection | Increase in percent over starting value | |
|---|---|---|---|
| | | Contraction amplitude (positive inotropic action), | Coronary blood flow, |
| (a) | 1.0 | +149 | +82 |
| | 10.0 | +235 | +159 |
| (b) | 1.0 | +12 | +71 |
| | 10.0 | +47 | +106 |
| (c) | 1.0 | +2 | +43 |
| | 10.0 | +56 | +86 |

The acute toxicity of the compounds according to the invention expressed as $LD_{50}$, for example, in the case of mice is 50 mg./kg. and above upon intravenous application and 200 mg./kg. and above upon intraperitoneal application and in the case of rats 80 mg./kg. and above and 250 mg./kg. and above, respectively.

Compositions of the compounds according to the invention suitable for administration can be prepared with the aid of the usual assistants and adjuvants, such as, for example, water, alcohol, vegetable oils, emulsifiers, lactose, sugar alcohols, starch, talcum, colloidal silica, polyglycols, cellulose derivatives, magnesium stearate and the like. In view of the sensitivity of the active compounds to oxidation, antioxidants, such as, sodium bisulfite or ascorbic acid or complex formers, such as, ethylene diamino tetraacetic acid can advantageously be incorporated in the compositions as stabilizers. In addition, it is possible to incorporate preservatives, buffers, taste correctives and the like.

The following is an illustrative example of the preparation of tablets containing 20 mg. of compound (a)

|  | G. |
|---|---|
| Compound (a) | 20 |
| Sodium metabisulfite | 0.2 |
| Ethylene diamine tetraacetic acid | 0.2 |
| Finely divided pyrogenic silica (Aerosil) | 2 |
| Mannitol | 128 | where intimately mixed and a granulate was prepared therefrom using about 50 g. of a granulating agent composed of:

|  | G. |
|---|---|
| Methocel 60 Hg (methyl cellulose) | 1 |
| Ethanol | 12 |
| H₂O | 37 |

The granulate was sieved to provide a grain size of 0.5–1 mm. and then mixed with

|  | G. |
|---|---|
| Magnesium stearate | 0.9 |
| Microcrystalline cellulose (Avicelpharm) | 4 |
| Cornstarch | 14.5 |

1000 tablets of 170 mg. were pressed from such mixture, each containing 20 mg. of compound (a).

The following is an illustrative example for the production of an injection solution:

0.3 g. sodium metabisulfite
0.3 g. ethylene diamine tetraacetic acid disodium salt
3.6 ml. 10% aqueous NaOH
30 ml. 6% acetic acid were dissolved in sufficient water prepared for injection purposes to produce 1000 ml. of solution. The solution was saturated with nitrogen and filtered through a germ removing filter. 0.5 g. of the active compound (a) were dissolved in 100 ml. of the resulting sterile filtrate and the solution filtered through a glass frit G4 filter and then combined with the main portion of the sterile filtrate. 1 ml. of the resulting solution was introduced into ampoules under nitrogen (1 ml. per ampoule) and sterilized for 30 minutes at 100° C. Each ampoule contained 0.5 mg. of the active compound (a).

The lowest effective dosage range and general dosage range of the compounds according to the invention as indicated by animal tests are as follows.

(a) The lowest dosage providing broncholytic action:
   0.0001 mg./kg. intravenous
   0.001 mg./kg. sublingual
   0.005 mg./kg. oral
   0.1% spray inhalation applied 15 seconds
   0.01% spray inhalation applied 2 minutes
(b) General dosage range
   0.0001 to 0.001 mg./kg. intravenous
   0.001 to 0.1 mg./kg. sublingual
   0.05 to 0.35 mg./kg. oral
   0.1% spray inhalation application 15 seconds to 3 minutes (1) Bronchodilatory activity: The experiments were performed in dogs according to the method of Konzett and Rössler (Arch. Exp. Path. Pharmakol. 195, 71, 1940), originally used for guinea pigs.

Mongrel dogs were anaesthetized with ether, decerebrated and demedullated and artificially respirated. After the preparation of the trachea this organ was intubated with a glass tube. The tube is divided into three branches at the end outside of the trachea. One branch was connected with a piston recorder whose lever transmitted the data to the kymograph, the second branch was connected with the respiratory pump to blow the air into the lungs; the third one was connected with the pump for the transport of the expired air from the lungs. The intravenous injection of 20 mg./kg. histaminedehydrochloride produces a bronchoconstriction. Consequently, the air coming from the respiration pump cannot enter the lungs and is, therefore, conducted to the piston recorder. The incerase of the air pressure now provokes a rise of the lever and consequently a sharp increase of the curve at the kymograph. After a few seconds the effect of histamine is finished, the bronchoconstriction is abolished and a normal respiration occurs.

The intravenous injection of a bronchodilatory agent is able to inhibit the bronchospasm of histaminedihydrochloride. Therefore, the application of a bronchodilating compound produces no signs of a histamine induced bronchoconstriction in the lungs as well as on the curve at the kymograph.

The bronchodilating activity of a substance is tested in 3 to 5 dosages to find out a dose-depending relationship of the drug.

It was found that the compounds according to the invention produced a strong bronchodilatory effect after a bronchospasm was induced.

(2) Analyses of the cardiac and circulatory functions according to the method of Broemser and Ranke (O. Frank; Ztschr. f. Biologie, 90, 27, 1930); Rein and Schneider: Physiologie des Menschen, 13./14. Aufl., 152 (1960).

Mongrel dogs are anaesthetized with pentobarbital. The art. carotis sin. and the art. femoralis sin. are cannulated and connected with a statham transducer; the blood pressure of both arteries is registered via the statham transducer by a multiscriptor. The test substance is injected intravenously in the right femoral vein. At the end of the experiment the length of the aorta abdominalis and the diameter of the aorta pars ascendens are measured. These data and the bleed pressure reaction are the basic values. Using the formulas of Broemser and Ranke now the diverse parameters of the cardiac and circulatory function are calculated, e.g., stroke volume, arterial blood pressure (mean arterial pressure, systolic and diastolic arterial blood pressure), heart rate and some other parameters.

These values found out as mean values of 3 to 5 single values in each dosage represent the cardiac and circulatory effectiveness of a drug.

It was found that the compounds according to the invention produce when applied a strong positive inotropic action.

(d) 7-{3-[1-methyl-2-(3,4-dihydroxy-phenyl)-2-hydroxy-ethylamino]-propyl}-theophylline·HCl

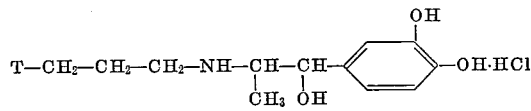

This product was obtained analogously as product (b). Its melting point is 235–238° C.

I claim:
1. A method of alleviating an asthmatic bronchial condition involving heart insufficiency in a mammal afflicted therewith which comprises administering to such mammal an effective amount of a compound selected from the group consisting of compounds of the formula

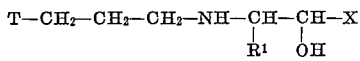

wherein T signifies the theophyllinyl-(7)-group, $R^1$ is H or $CH_3$, X is selected from the group consisting of monohydroxy phenyl, 3,5 dihydroxy phenyl and, when $R^1$ is $CH_3$, 3,4 dihydroxy phenyl, and their pharmacologically acceptable acid addition salts to alleviate said asthmatic bronchial conditions.

2. The process of claim 1 in which said compound is administered orally.
3. The process of claim 1 in which said compound is administered intravenously.
4. The process of claim 1 in which said compound is administered sublingually.
5. The process of claim 1 in which said compound is administered by spray inhalation.
6. A method according to claim 1 wherein the compound is 7-[3-(2-(3,5-dihydroxyphenyl)-2-hydroxyethylamino)-propyl]-theophylline.
7. A method according to claim 1 wherein the compound is 7-[3-(2-p-hydroxyphenyl-2-hydroxyethylamino)-propyl]-theophylline.
8. A method according to claim 1 wherein the compound is 7-[3-(1'-methyl-2'-p-hydroxyphenyl-2'-hydroxyethylamino)-propyl]-theophylline.
9. A method according to claim 1 wherein the compound is 7-[3-(1-methyl-2-(3,4-dihydroxyphenyl)-2-hydroxyethylamino)-propyl] theophylline.
10. The process of claim 1 in which said compound is administered orally at a dosage of 0.05 to 0.35 mg./kg.
11. The process of claim 1 in which said compound is administered intravenously at a dosage of 0.0001 to 0.001 mg./kg.
12. The process of claim 1 in which said compound is administered sublingually at a dosage of 0.001 to 0.1 mg./kg.
13. The process of claim 1 in which said compound is administered by spray inhalation at 0.01% to 0.1% applied for 15 seconds to 3 minutes.

References Cited

UNITED STATES PATENTS 3,109,773  11/1963  Mercer et al. _____ 424—253
3,124,579  3/1964   Yoshida et al. _____ 260—256

ALBERT T. MEYERS, Primary Examiner

D. M. STEPHENS, Assistant Examiner